United States Patent
Jeon et al.

(10) Patent No.: US 7,450,169 B2
(45) Date of Patent: Nov. 11, 2008

(54) METHOD OF CONTROLLING DIGITAL PHOTOGRAPHING APPARATUS FOR EFFICIENT REPLAY OPERATION, AND DIGITAL PHOTOGRAPHING APPARATUS ADOPTING THE METHOD

(75) Inventors: Dae-jin Jeon, Seongnam-si (KR); Seung-yun Lee, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 627 days.

(21) Appl. No.: 11/033,569

(22) Filed: Jan. 11, 2005

(65) Prior Publication Data
US 2006/0038906 A1 Feb. 23, 2006

(30) Foreign Application Priority Data
Aug. 19, 2004 (KR) ............... 10-2004-0065383

(51) Int. Cl.
*H04N 5/222* (2006.01)
(52) U.S. Cl. ............... 348/333.11; 348/333.01; 348/333.12
(58) Field of Classification Search ............ 348/333.01, 348/333.11, 211.4; 396/85
See application file for complete search history.

(56) References Cited

U.S. PATENT DOCUMENTS

| 6,091,902 | A * | 7/2000 | Komatsuzaki et al. | 396/60 |
|---|---|---|---|---|
| 6,636,264 | B1 * | 10/2003 | Nakao et al. | 348/375 |
| 6,683,653 | B1 * | 1/2004 | Miyake et al. | 348/373 |
| 6,781,629 | B2 * | 8/2004 | Ohnogi | 348/333.01 |
| 7,061,535 | B2 * | 6/2006 | Misawa et al. | 348/375 |
| 7,265,786 | B2 * | 9/2007 | Venturino et al. | 348/333.02 |
| 7,298,409 | B1 * | 11/2007 | Misawa | 348/333.01 |
| 7,319,490 | B2 * | 1/2008 | Kanamori et al. | 348/375 |
| 2001/0014214 | A1 * | 8/2001 | Hayashi et al. | 396/85 |
| 2004/0033070 | A1 * | 2/2004 | Haraguchi et al. | 396/84 |
| 2004/0119876 | A1 | 6/2004 | Ohmori et al. | |
| 2004/0145670 | A1 * | 7/2004 | Hong | 348/333.01 |
| 2005/0007459 | A1 * | 1/2005 | Kawai et al. | 348/211.99 |
| 2005/0174459 | A1 * | 8/2005 | Naka | 348/333.01 |

FOREIGN PATENT DOCUMENTS

JP 2000-232598 A 8/2000

OTHER PUBLICATIONS

Office Action established for CN 200510052158.4 (Mar. 21, 2008).

\* cited by examiner

*Primary Examiner*—Ngoc-Yen T. Vu
*Assistant Examiner*—Kent Wang
(74) *Attorney, Agent, or Firm*—Drinker Biddle & Reath LLP

(57) ABSTRACT

A method of controlling a digital photographing apparatus that displays a next image file in the forward or reverse direction according to a signal received from a first or second direction button, reduces or enlarges a currently displayed image in response to a signal received from a third or fourth button, and moves a display region of the currently displayed image according to the signal from the first or second direction button when the currently displayed image is enlarged in a reproducing mode is provided. The method includes displaying the next file in the forward or reverse direction of an enlarged currently displayed image in response to a first or second operating signal which includes the signal generated by the first or second direction button.

19 Claims, 7 Drawing Sheets

METHOD OF CONTROLLING DIGITAL PHOTOGRAPHING APPARATUS FOR EFFICIENT REPLAY OPERATION, AND DIGITAL PHOTOGRAPHING APPARATUS ADOPTING THE METHOD

BACKGROUND OF THE INVENTION

This application claims the priority of Korean Patent Application No. 2004-65383, filed on Aug. 19, 2004, in the Korean Intellectual Property Office, the disclosure of which is incorporated herein in its entirety by reference.

1. Field of the Invention

The present invention relates to a method of controlling a digital photographing apparatus and a digital photographing apparatus adopting the method. More particularly, the invention relates to a method of controlling a digital photographing apparatus that, when in a reproducing mode, reproduces files previously generated on a storage medium in an image photographing mode. The invention further relates to a digital photographing apparatus adopting the described method.

2. Description of the Related Art

A typical digital photographing apparatus is disclosed in U.S. Patent Publication No. 2004/0119876, entitled "Method of Notification of Inadequate Picture Quality," which was filed by the present applicant and published in 2004. In such a general digital photographing apparatus, images are generated on storage medium when the apparatus is operating in an image photographing mode and the image files are reproduced when the apparatus is operating in a reproducing mode.

In a reproducing mode of a typical digital photographing apparatus, the next file in the forward or reverse direction is displayed according to a signal received from a first or second direction button, for example, a left or right button. In addition, an image currently displayed is either enlarged or reduced according to a signal received from a third button or a fourth button, for example, a wide-angle zoom button or a telephoto zoom button. Also, when the currently displayed image is enlarged, the display region of the enlarged image can be moved according to a signal transmitted from the first or second direction button.

As a result, the first and second buttons perform two functions when the digital photographing apparatus is operating in the reproducing mode. Under a first condition, the first and second buttons are used to display the next file in the forward or reverse direction. Under a second condition, the first and second buttons are used to move the displayed region of the enlarged image to the left or right. Here, a premise of the first condition is that the displayed image is not currently enlarged, and a premise of the second condition is that the currently displayed image is enlarged.

Accordingly, the first and second direction buttons perform not only a first function in the first condition, but also perform a second function in the second condition, which exists only in correspondence to the first condition. Therefore, the next file in a forward or reverse direction cannot be displayed by pressing the first or second button when the displayed file is enlarged. Thus, when the displayed image is enlarged, the user suffers the inconvenience of being required to press the third button (e.g., the telephoto zoom button) so that the size of the enlarged image returns to the standard size in order to display the next file in the forward or reverse direction by pressing the first or second button.

SUMMARY OF THE INVENTION

The present invention provides both a method of controlling a digital photographing apparatus and a digital photographing apparatus using the method. The digital photographing apparatus is convenient for the user to operate because a first function can be performed even in a second condition using first and second direction buttons that generally perform the first function in a first condition and perform a second function in the second condition where the second condition exists only in correspondence to the first condition. Herein an exemplary first condition is when the displayed image is not enlarged and an exemplary second condition is when the displayed image is enlarged.

According to an aspect of the present invention, there is provided a method of controlling a digital photographing apparatus that displays a next image file in a forward or reverse direction according to a signal received from a first or second direction button, reduces or enlarges a currently displayed image in response to a signal received from a third or fourth button, and moves a display region of the currently displayed image according to the signal from the first or second direction button when the currently displayed image is enlarged in a reproducing mode. The method includes displaying a next file in a forward or reverse direction in response to a first or second operating signal that includes the signal generated by the first or second direction button if the currently displayed image is enlarged.

In other words, the next image file in the forward or reverse direction can be displayed using the first or second operating signal, which includes the signal from the first or second direction button, when the currently displayed image is enlarged. That is, although the first and second direction buttons generally perform a first function in a first condition and perform a second function in a second condition, the first function can be directly performed even in the second condition. In short, the need to carry out a process to restore the apparatus to the first condition from the second condition prior to performing the first function is eliminated. As a result, controlling the operation of the digital photographing apparatus becomes more convenient for the user.

According to another aspect of the present invention, there is provided a digital photographing apparatus adopting the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
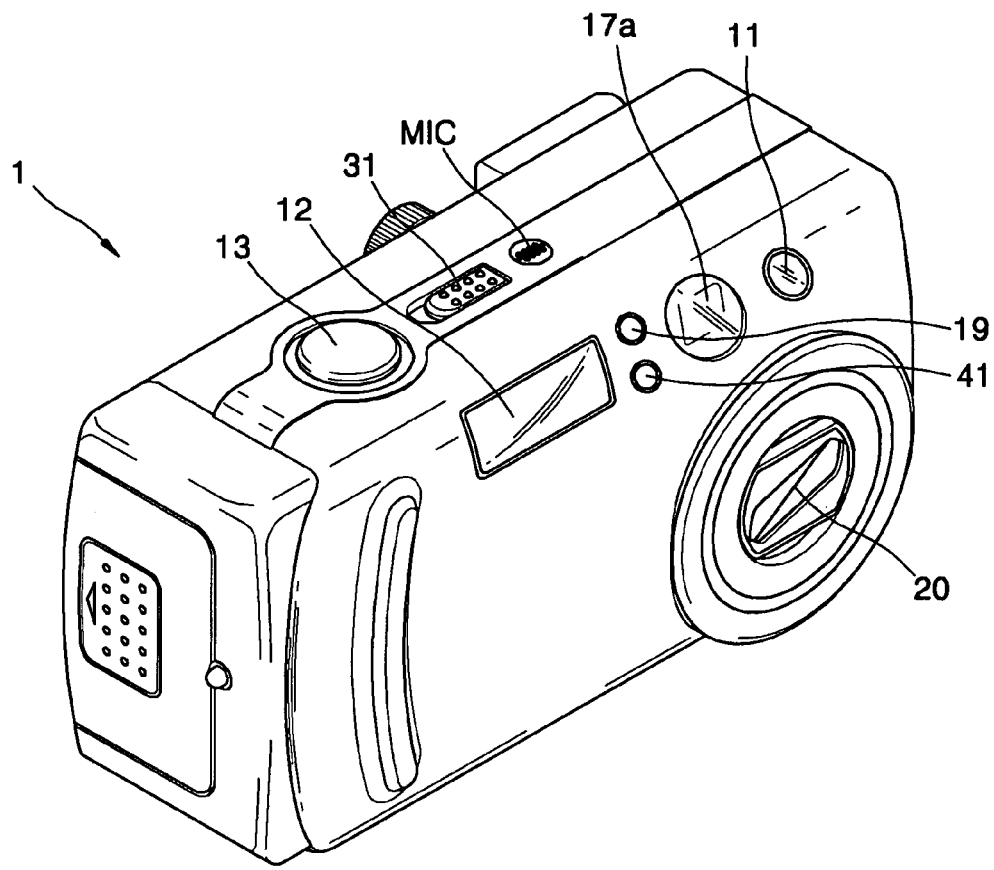
FIG. 1 is a perspective diagram illustrating the front and top of a digital photographing apparatus according to an embodiment of the present invention.

Referring to FIG. 1, a self-timer lamp 11, a flash 12, a viewfinder 17a, a flash light sensor (FS) 19, a lens 20, and a remote receiver 41 are on the front of a digital camera 1, which is a digital photographing apparatus according to an embodiment of the present invention. A microphone MIC, a shutter release button 13, and a power switch 31 are on the top of the digital camera 1.

The self-timer lamp 11 operates for a predetermined amount of time after the shutter release button 13 is pressed until an image is captured when in a self-timing mode. The FS 19 senses the amount of ambient light when the flash 12 operates, and inputs the amount of ambient light into a digital signal processor (DSP) 507 (see FIG. 3) via a micro-controller 512 (see FIG. 3). The remote receiver 41 receives a command signal (e.g., a photographing command signal) from a remote control (not shown) and inputs the command signal into the DSP 507 via the micro-controller 512.

The shutter release button 13 has a two-step structure. That is, if the user presses the shutter release button 13 to a first step, a S1 signal from the shutter release button 13 is turned on, and if the shutter release button 13 is pressed to a second step, a S2 signal from the shutter release button 13 is turned on (refer to FIGS. 4 and 6).

Figure 2:
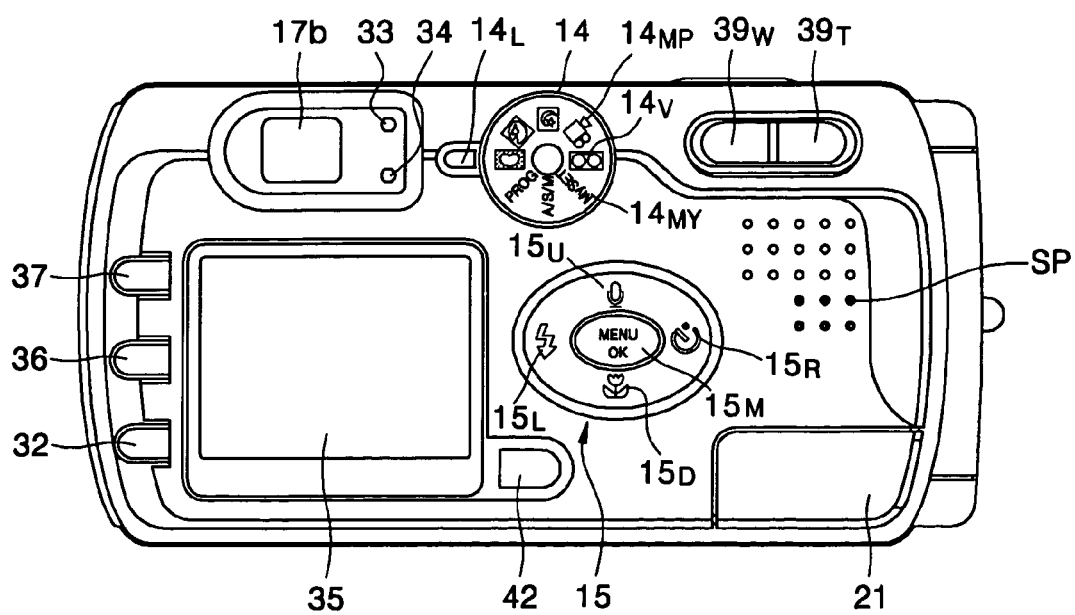
FIG. 2 is a rear view of the digital photographing apparatus of FIG. 1.

Referring to FIG. 2, a mode dial 14, function buttons 15, a manual-focus/delete button 36, a manual-adjust/reproduce/stop button 37, a reproducing mode button 42, a speaker SP, a monitor button 32, an automatic-focus lamp 33, a viewfinder 17b, a flash standby lamp 34, a color liquid crystal display (LCD) panel 35, the wide-angle zoom button $39_W$, the telephoto zoom button $39_T$, and an external interface unit 21 are displayed on the rear of the digital camera 1.

The mode dial 14 is used to select an operating mode among a plurality of operating modes of the digital camera 1. The plurality of operating modes may include, for example, a simple image photographing mode, a program image photographing mode, a portrait image photographing mode, a night scene image photographing mode, a manual image photographing mode, a moving picture photographing mode $14_{MP}$, a user setting mode $14_{MY}$, and a recording mode $14_V$.

The user setting mode $14_{MY}$ is an operating mode in which the user sets the photographing settings needed for each image photographing mode.

The recording mode $14_V$ is an operating mode in which only sounds, e.g. the user's voice, are recorded. When the user presses the shutter release button 13 while in the recording mode $14_V$, an audio file is created in a storage medium such as a memory card, and the input audio data is stored in the audio file. When the user presses the shutter release button 13 again, the digital camera stops storing input audio data, and the audio file is completed.

The function buttons 15 are used to perform specific functions of the digital camera 1 as well as to change the direction of an activated cursor on a menu screen of the color LCD 35. An example of each function of the function buttons 15 will now be described in detail.

If the user presses a self-time/right button $15_R$ when an image currently displayed in a reproducing mode is not enlarged, the next file in the forward direction is displayed. If the user presses the self-time/right button $15_R$ when an image currently displayed in the reproducing mode is enlarged, the displayed region of the enlarged image moves to the right. If the user presses the self-time/right button $15_R$ in a preview mode, a self-timer mode in which a photograph is taken automatically after a predetermined amount of time, for example, 10 seconds, is performed.

If the user presses a flash/left button $15_L$ when the currently displayed image is not enlarged in the reproducing mode, the next file in the reverse direction is displayed. If the user presses the flash/left button $15_L$ when an image currently displayed in the reproducing mode is enlarged, the displayed region of the enlarged image moves to the left. The user may select a flash mode for the image photographing modes by pressing the flash/left button $15_L$ in the preview mode.

When the current operating mode is the reproducing mode and the currently displayed image is enlarged, pressing a macro/down button $15_D$ moves the displayed region of the enlarged image downwards. If the apparatus is in the preview mode, the user sets near automatic focusing for the image photographing modes by pressing the macro/down button $15_D$.

If the user presses an audio-memo/up button $15_U$ while in the reproducing mode and the currently displayed image is enlarged, the displayed region of the enlarged image moves upwards. If the user presses the audio-memo/up button $15_U$ while in the preview mode, the user can record audio for a predetermined amount of time, for example, 10 seconds, after taking the next photo in the photographing operation.

When the current operating mode is a setting mode, operating conditions of the digital camera can be changed. In the setting mode, the user may move an active cursor among a plurality of selection categories and may select one of the selection categories by highlighting it with the active cursor. When a selection category is selected by a user, the user may change an operating condition that corresponds to the selected selection category by pressing a menu/select-confirm button $15_M$.

The manual-adjust/reproduce/stop button 37 is used to manually adjust particular conditions while the digital camera is operating in the manual focus mode or the manual exposure mode. Also, when the current operating mode is the reproducing mode and a moving picture file is selected, if the user presses the manual-adjust/reproduce/stop button 37, the selected moving picture file is reproduced or stopped.

The manual-focus/delete button 36 is used to manually focus or delete an image when the digital camera is in the image photographing mode.

The monitor button 32 is used to control the operation of the color LCD panel 35. For example, when the digital camera is in the image photographing mode, if the user presses the monitor button 32 a first time, an image file of a subject and photographing information about the image file is displayed on the color LCD panel 35. If the monitor button 32 is pressed a second time, however, power to the color LCD panel 35 is blocked. When the digital camera is in the reproducing mode and an image is being reproduced, if the user presses the monitor button 32 a first time, photographing information about the image file being reproduced is displayed on the color LCD panel 35, but if the monitor button 32 is pressed a second time, then only the image file is displayed.

When the digital camera is operating in the reproducing mode and the currently displayed image is enlarged, pressing the self-timer/right button $15_R$ together with the monitor button 32 will display the next file in the forward direction, and pressing the flash/left button $15_L$ together with the monitor button 32 will display the next file in the reverse direction. As such, when the currently displayed image is enlarged, the next file in the forward or reverse direction can be displayed by using a first or second operation signal including a signal from the self-timer/right button $15_R$ or the flash/left button $15_L$.

Thus, by pressing the monitor button 32 in combination with a button that performs a first function while in the first condition and performs a second function under a second condition which exists only in correspondence to the first condition, the first function can be directly performed even in the second condition. As a result, it is no longer necessary to perform a process of recovering to the first condition, e.g. displaying an image that is not enlarged, from the second condition, e.g. displaying an enlarged image, in order to perform the first function, thereby increasing the convenience to the users. A reproducing procedure related to this function will be described in more detail with reference to FIG. 7 later.

The reproducing mode button 42 is used to toggle from the reproducing mode to the preview mode and vice versa.

The automatic-focus lamp 33 is operated when the digital camera 1 is well focused. The flash standby lamp 34 is operated when the flash 12 (see FIG. 1) is in standby mode. A mode indicating lamp $14_L$ indicates a selected mode of the mode dial 14.

Figure 3:
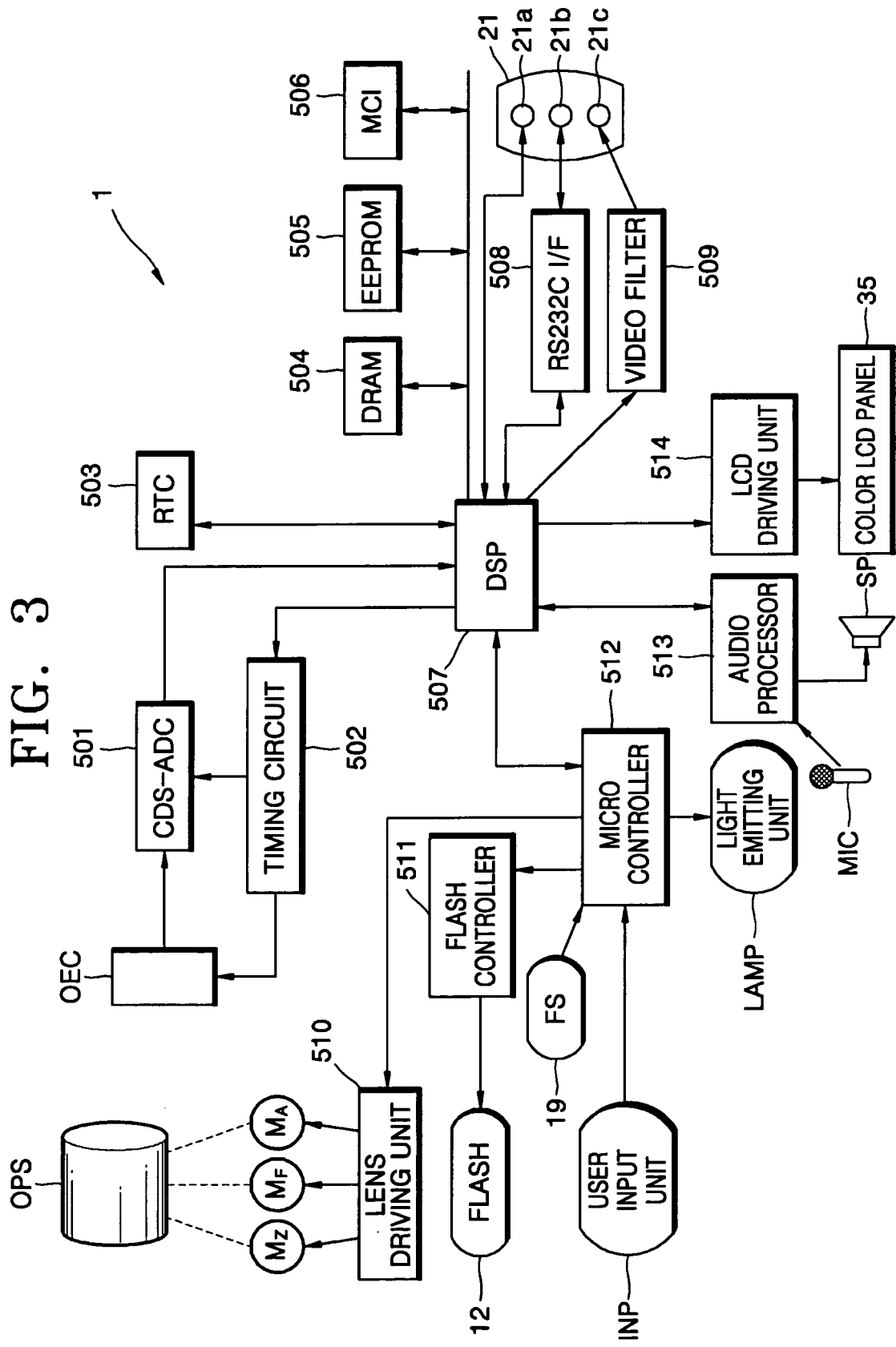
FIG. 3 is a block diagram of the digital photographing apparatus of FIG. 1.

FIG. 3 is a block diagram of the digital camera 1 of FIG. 1. Referring to FIGS. 1 through 3, the overall structure and operation of the digital camera 1 will now be described.

An optical system OPS that includes a lens unit (not shown) and a filter unit (not shown) optically processes light reflected from a subject.

The lens unit of the optical system OPS includes a zoom lens, a focus lens, and a compensation lens.

When the user presses the wide-angle zoom button $39_W$ or the telephoto zoom button $39_T$ included in a user input unit INP, a signal corresponding to the wide-angle zoom button $39_W$ or the telephoto zoom button $39_T$ is input to the micro-controller 512. Accordingly, as the micro-controller 512 controls a lens driving unit 510, a zoom motor $M_Z$ is driven and moves the zoom lens. That is, when the wide-angle zoom button $39_W$ is pressed, the focal length of the zoom lens is shortened, and thus the viewing angle is decreased. The location of the focus lens is adjusted after the location of the zoom lens is set. Therefore, the viewing angle is hardly affected by the location of the focus lens.

In an automatic focusing mode, a main controller (not shown) included in the DSP 507 controls the lens driving unit 510 via the micro-controller 512, and thus a focus motor $M_F$ is operated. Accordingly, the focus lens moves, and in this process, the location of the focus lens at which a high frequency component of an image signal is the greatest, for example, a number of steps of the focus motor $M_F$, is set.

The compensation lens of the optical system OPS compensates the overall refractive index of the optical system OPS, and thus is not operated separately. A motor $M_A$ drives an aperture (not shown).

At the filter unit of the optical system OPS, an optical low pass filter removes optical noise from high frequency components of incident light, and an infra-red cut filter blocks infra-red components of incident light.

A photoelectric converter OEC of a charge-coupled device (CCD) or a complementary metal oxide semiconductor (CMOS) (not shown) converts light received from the optical system OPS into electrical analog signals. Here, the DSP 507 controls a timing circuit 502 to control the operation of a correlation double sampler and analog-to-digital converter (CDS-ADC) 501. The CDS-ADC 501, processes the analog signals received from the photoelectric converter OEC, and converts them into digital signals after removing high frequency noise and altering their bandwidth.

A real-time clock (RTC) 503 provides time information to the DSP 507. The DSP 507 processes the digital signals output from the CDS-ADC 501 and generates digital image signals that are divided into brightness and chromaticity signals.

A light emitting unit LAMP that is operated by the micro-controller 512 according to control signals received from the DSP 507 including the main controller includes the self-timer lamp 11, the automatic-focus lamp 33, the mode indicating lamp $14_L$, and the flash standby lamp 34. The user input unit INP includes the shutter release button 13, the mode dial 14, the function buttons 15, the monitor button 32, the manual-focus/delete button 36, the manual/adjust/reproduce/stop button 37, the wide-angle zoom button $39_W$, the telephoto zoom button $39_T$, and a reproducing mode button 42.

The digital image signal transmitted from the DSP 507 is temporarily stored in a dynamic random access memory (DRAM) 504. Program and setting information needed for the operation of the DSP 507 is stored in an electrically erasable and programmable read-only memory (EEPROM) 505. A removable memory card may be inserted into a memory card interface (MCI) 506.

The digital image signals from the DSP 507 are input to an LCD driving unit 514, and an image is displayed on the color LCD panel 35.

The digital image signals output from the DSP 507 can be transmitted in series via a universal serial bus (USB) connector 21a or an RS232C interface 508 and its connector 21b, or can be transmitted as video signals via a video filter 509 and a video outputting unit 21c. Here, the DSP 507 includes a main controller embedded therein.

An audio processor 513 relays audio signals from a microphone MIC to the DSP 507 or a speaker SP. The audio processor 513 also outputs audio signals from the DSP 507 to the speaker SP.

Meanwhile, the micro-controller 512 operates the flash 12 by controlling the operation of a flash controller 511 according to a signal output from the FS 19.

The main operation of the DSP 507 illustrated in FIG. 3 will now be described with reference to FIGS. 1 through 4.

Figure 5:
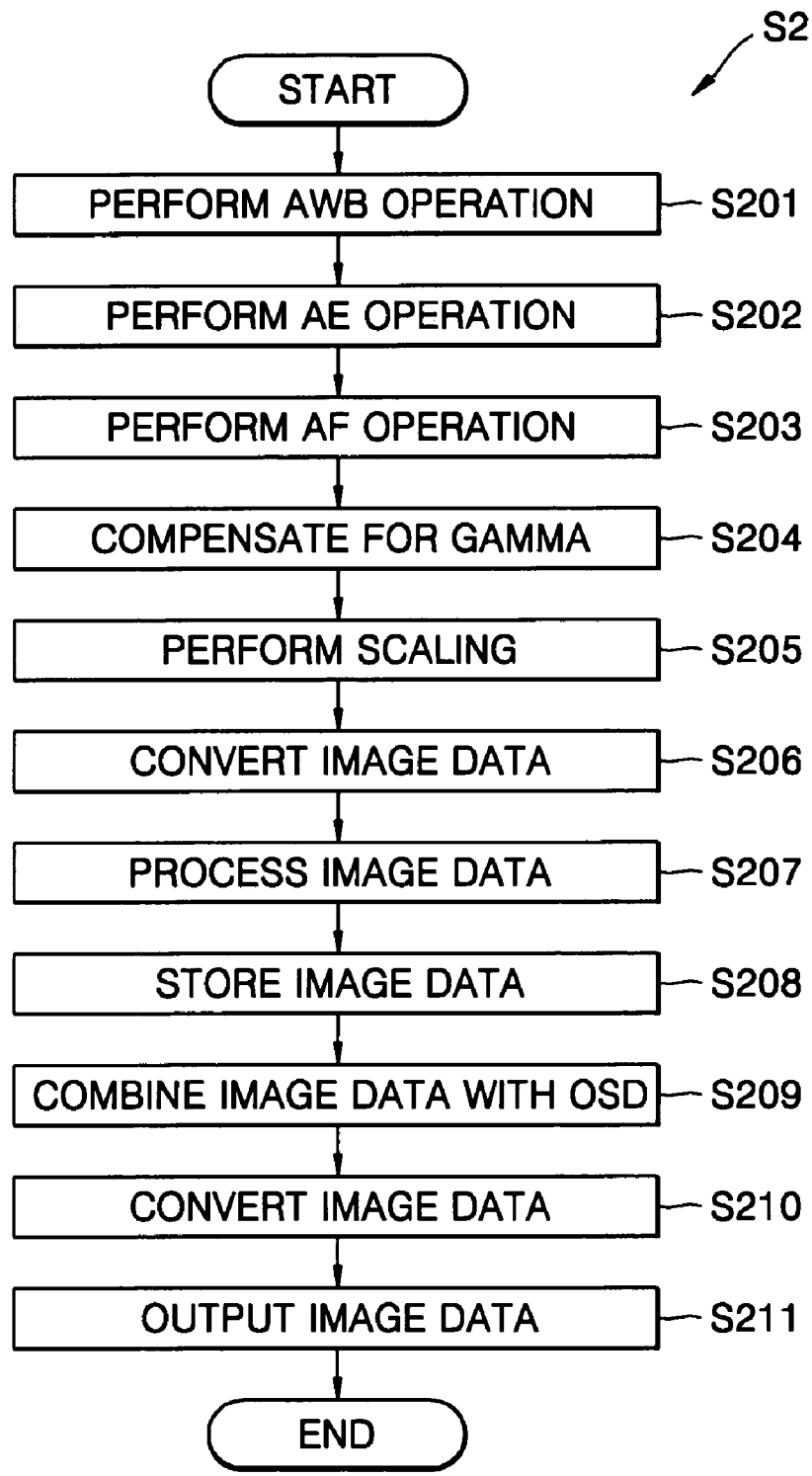
FIG. 5 is a flow chart illustrating an embodiment of a procedure for performing step S2 of the method of FIG. 4.

When power is supplied to the digital camera 1, the DSP 507 performs initialization (Operation S1). When operation S1 is performed, the DSP 507 operates in the preview mode (Operation S2). In the preview mode, an input image is displayed on the color LCD panel 35. Operations related to this preview mode will be described in more detail with reference to FIG. 5 later.

Next, when the user presses the shutter release button 13 down to a first level and the first signal S1 transmitted from the shutter release button 13 is activated (Operation S3), the DSP 507 operates in the current image photographing mode (Operation S4). The current image photographing mode (Operation S4) will be described in more detail with reference to FIG. 6 later.

Then, if a signal corresponding to the setting mode is received from the user input unit INP (Operation S5), the digital camera 1 operates in the setting mode to set operating conditions according to input signals received from the user via the user input unit INP (Operation S6).

If an end signal is not generated, the DSP 507 performs the following operations (Operation S7).

First, if a signal received from the reproducing mode button 42 within the user input unit INP is not generated (Operation S8), the digital camera 1 operates in the reproducing mode (Operation S9). In the reproducing mode, reproducing operations are performed according to the input signals received from the user input unit INP. The reproducing mode (Operation S9) will be described with reference to FIG. 7 later. When the reproducing mode is terminated, the operations are repeated from Operation S2.

Referring to FIGS. 1 through 3 and FIG. 5, in the preview mode (Operation S2), the DSP 507 first performs automatic white balance (AWB) and set parameters related to the white balance (Operation S201).

Next, the DSP 507 performs an automatic exposure (AE) mode (Operation S202). Here, the DSP 507 calculates the brightness of incident light. Also, the DSP 507 drives the aperture driving motor $M_A$ and sets a shutter speed, according to the calculated brightness of incident light. Next, the DSP 507 performs automatic focusing (AF) (Operation S203).

Then, the DSP 507 performs gamma compensation on the input image data (Operation S204) and scales the gamma compensated input image data so that the image fits the display (Operation S205).

Next, the DSP 507 converts the scaled input image data from red-green-blue image data to brightness-chromaticity image data (Operation S206). The DSP 507 processes the input image data in relation to, for example, a resolution and a display location and performs filtering (Operation S207).

Afterwards, the DSP 507 temporarily stores the input image data in the DRAM 504 (see FIG. 3) (Operation S208).

The DSP 507 combines the input image data temporarily stored in the DRAM 504 with on-screen display data (Operation S209). The DSP 507 converts the combined image data from brightness-chromaticity image data to red-green-blue image data (Operation S210) and outputs the red-green-blue image data to the LCD driving unit 514 (see FIG. 3) (Operation S211).

Figure 4:
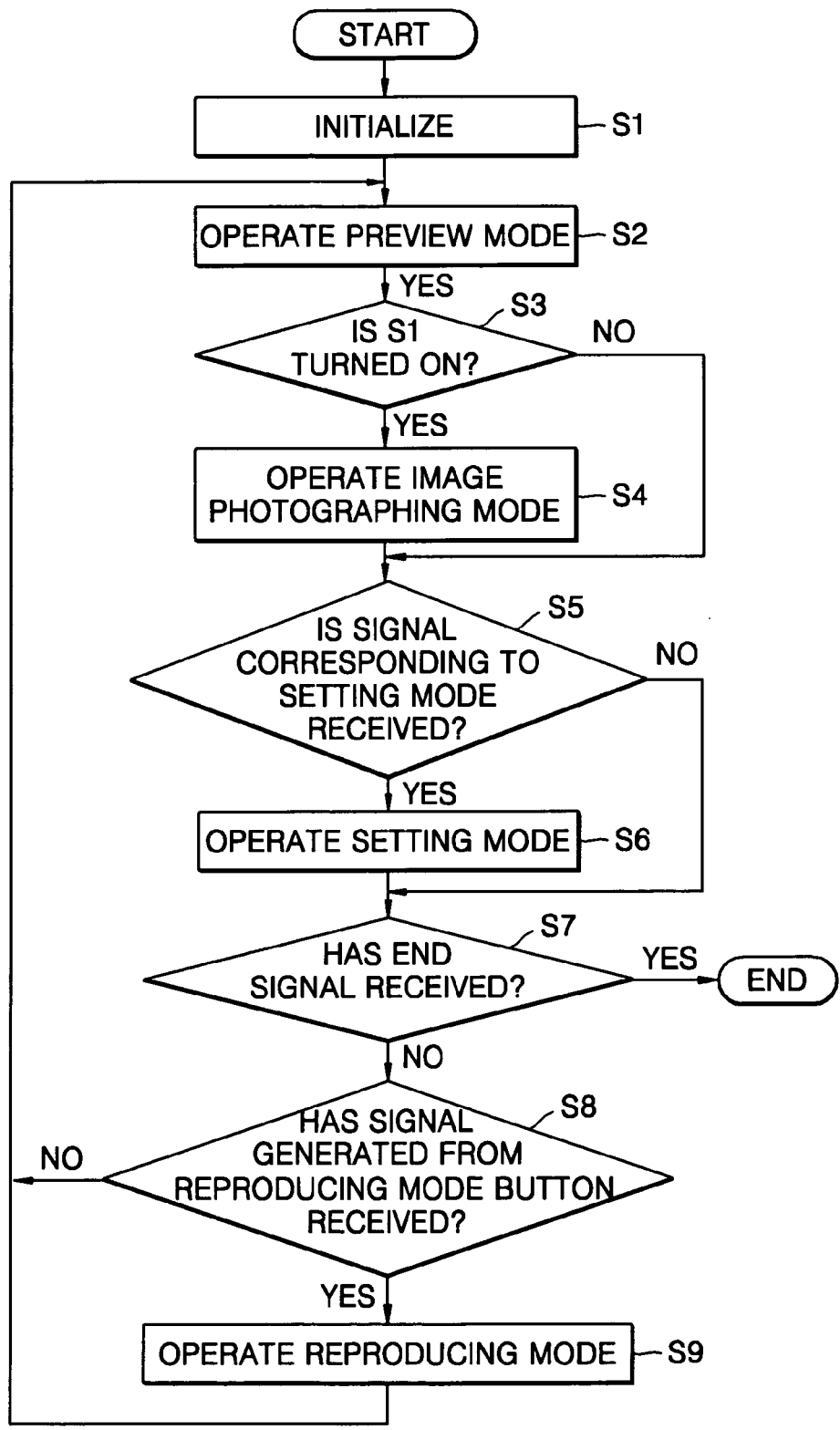
FIG. 4 is a flow chart illustrating an embodiment of a main procedure of the digital signal processor of FIG. 3.
Figure 6:
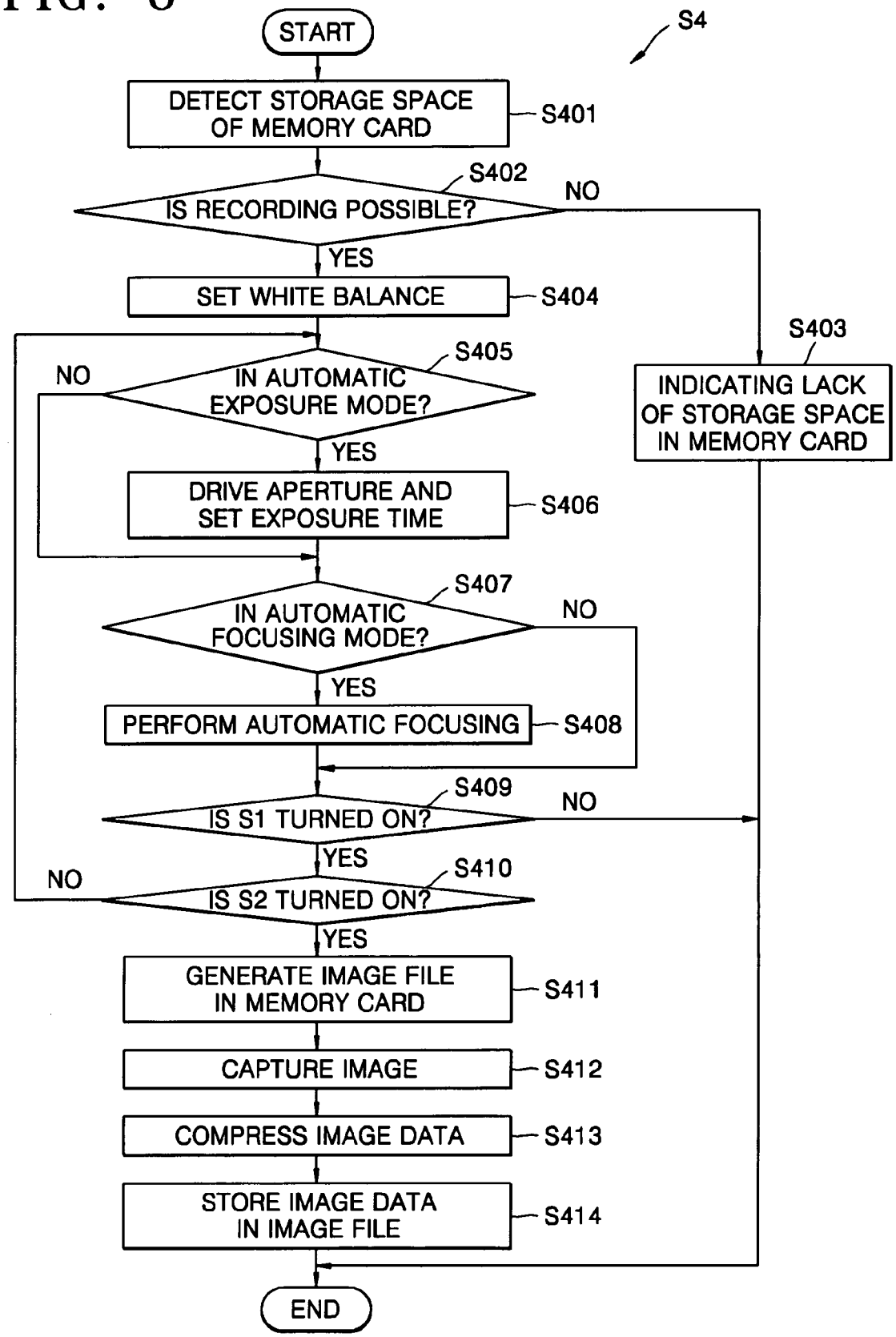
FIG. 6 is a flow chart illustrating an embodiment of a procedure for performing step S4 of FIG. 4.

FIG. 6 is a flow chart illustrating an embodiment of the image photographing mode (Operation S4) of the method illustrated in FIG. 4. The image photographing mode (Operation S4) will now be described with reference to FIGS. 1 through 3 and FIG. 6. For purposes of this discussion, it is assumed that the current location of the zoom lens has already been set.

First, the DSP 507 detects the remaining storage space in the memory card (Operation S401) and determines whether the remaining storage space is sufficient to store a digital image (Operation S402). If there is not enough storage space, the DSP 507 indicates the lack of storage space in the memory card and then terminates the image photographing mode (Operation S403). If there is enough storage space, the DSP 507 performs white balance according to the photographing conditions that are currently set and sets parameters related to the white balance (Operation S404).

Then, when in an AE mode (Operation S405), the DSP 507 calculates the brightness of the incident light, drives the aperture driving motor $M_A$ according to the calculated brightness, and sets an exposure time (Operation S406).

When in the automatic focusing mode (Operation S407), the DSP 507 performs automatic focusing and drives the focus lens (Operation S408).

The DSP 507 continues to perform the following operations if the first signal S1 from the shutter release button 13 is activated (Operation S409).

First, the DSP 507 determines whether the second signal S2 is activated (Operation S410). If the second signal S2 is inactivated, the DSP 507 repeats operations S405 through S410 since the user has not pressed the shutter release button 13 to the second level for photographing.

If the second signal S2 is activated, the DSP 507 generates an image file in a storage medium such as a memory card since the user has pressed the shutter release button 13 to the second level for photographing (Operation S411). The DSP 507 continually captures an image (Operation S412) until the DSP 507 receives stop image data from the CDS-ACD device 501. Then, the DSP 507 compresses the received image data (Operation S413) and stores the compressed image data as an image file (Operation S414).

Figure 7:
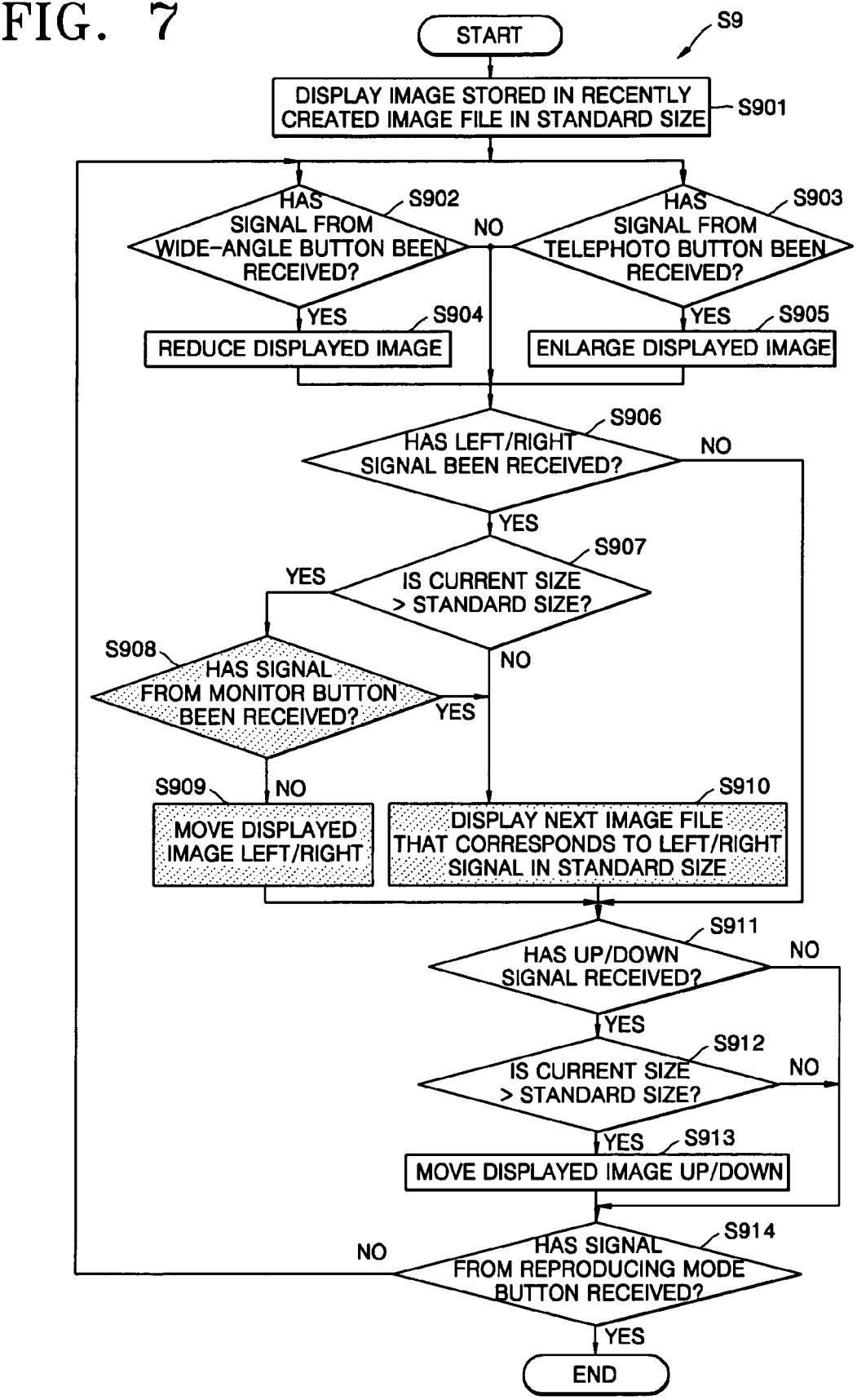
FIG. 7 is a flow chart illustrating an embodiment of a procedure for performing step S9 of FIG. 4.

FIG. 7 is a flow chart illustrating an embodiment of the reproducing mode (Operation S9) of the method illustrated in FIG. 4. Referring to FIGS. 1 through 3 and FIG. 7, first, the DSP 507 controls the LCD driving unit 514 so that the image stored in the recently created image file on the recording medium is displayed at a standard size (Operation S901).

Next, when a signal from the wide-angle zoom button 39W is generated by the user by pressing the wide-angle zoom button 39W (Operation S902), the DSP 507 controls the LCD driving unit 514 so that the currently displayed image may be displayed after being reduced by a unit scale factor (Operation S904). On the other hand, when a signal from the telephoto zoom button 39T is generated by the user by pressing the telephoto zoom button 39T (Operation S903), the DSP 507 controls the LCD driving unit 514 so that the currently displayed image may be displayed after being enlarged by a unit scale factor (Operation S905).

Next, if a left or right signal is generated by the user by pressing the flash/left button $15_L$ or the self-timer/right button $15_R$ (Operation S906), the DSP 507 checks whether the currently displayed image is enlarged (Operation S907).

If it is determined that the currently displayed image in operation S907 is not enlarged, the DSP 507 controls the LCD driving unit 514 so that image contained in the image file that corresponds to the left or right signal is displayed at the standard size (Operation S910). That is, if the user presses the self-timer/right button $15_R$ when the currently displayed image is not enlarged, the next image file in the forward direction is displayed, and if the user presses the flash/left button $15_L$, the next image file in the reverse direction is displayed.

If it is determined that the currently displayed image in operation S907 is enlarged, the DSP 507 checks whether the user is also pressing the monitor button 32 (Operation S908).

If a signal generated by the monitor button 32 is not detected in operation S908, the DSP 507 controls the LCD driving unit 514 so that the display region of the enlarged image is moved left or right according to the left or right signal of operation S906 (Operation S909).

If a signal generated by the monitor button 32 is detected in operation S908, the DSP 507 controls the LCD driving unit 514 so that the image contained in the next image file that corresponds to the left or right signal of operation S906 can be displayed at the standard size (Operation S910). That is, if the user presses the self-timer/right button $15_R$ and the monitor button 32 simultaneously when the currently displayed image is enlarged, the next image file in the forward direction is displayed, and if the user presses the flash/left button $15_L$ and the monitor button 32 simultaneously, the next image file in the reverse direction is displayed.

As such, by using a first or second operation signal that includes a signal from the self-timer/right button $15_R$ or flash/left button $15_L$, the next image file in the forward or reverse direction can be displayed when the currently displayed image is enlarged. For example, by pressing the monitor button 32 in combination with the self-timer/right button $15_R$ or flash/left button $15_L$, which performs the first function in the first condition and performs the second function in the second condition which exists only in correspondence to the first condition, the first function can be directly performed even in the second condition. As a result, the process of recovering to the first condition of standard image display from the second condition of enlarged image display in order to perform the first function is no longer necessary, thereby increasing convenience to the users.

When an up or down signal is generated by the user by pressing the audio-memo/up down $15_U$ or the macro/down button 15$_D$ (Operation S911), the DSP 507 determines whether the currently displayed image is enlarged (Operation S912). If the currently displayed image is determined to be enlarged in operation S912, the DSP 507 controls the LCD driving unit 514 so that the displayed region of the enlarged image moves up or down according to the up or down signal of operation S911 (Operation S913).

The operations S902 through S913 are repeated until a signal is generated by the reproducing mode button 42 (Operation S914).

Figure 8:
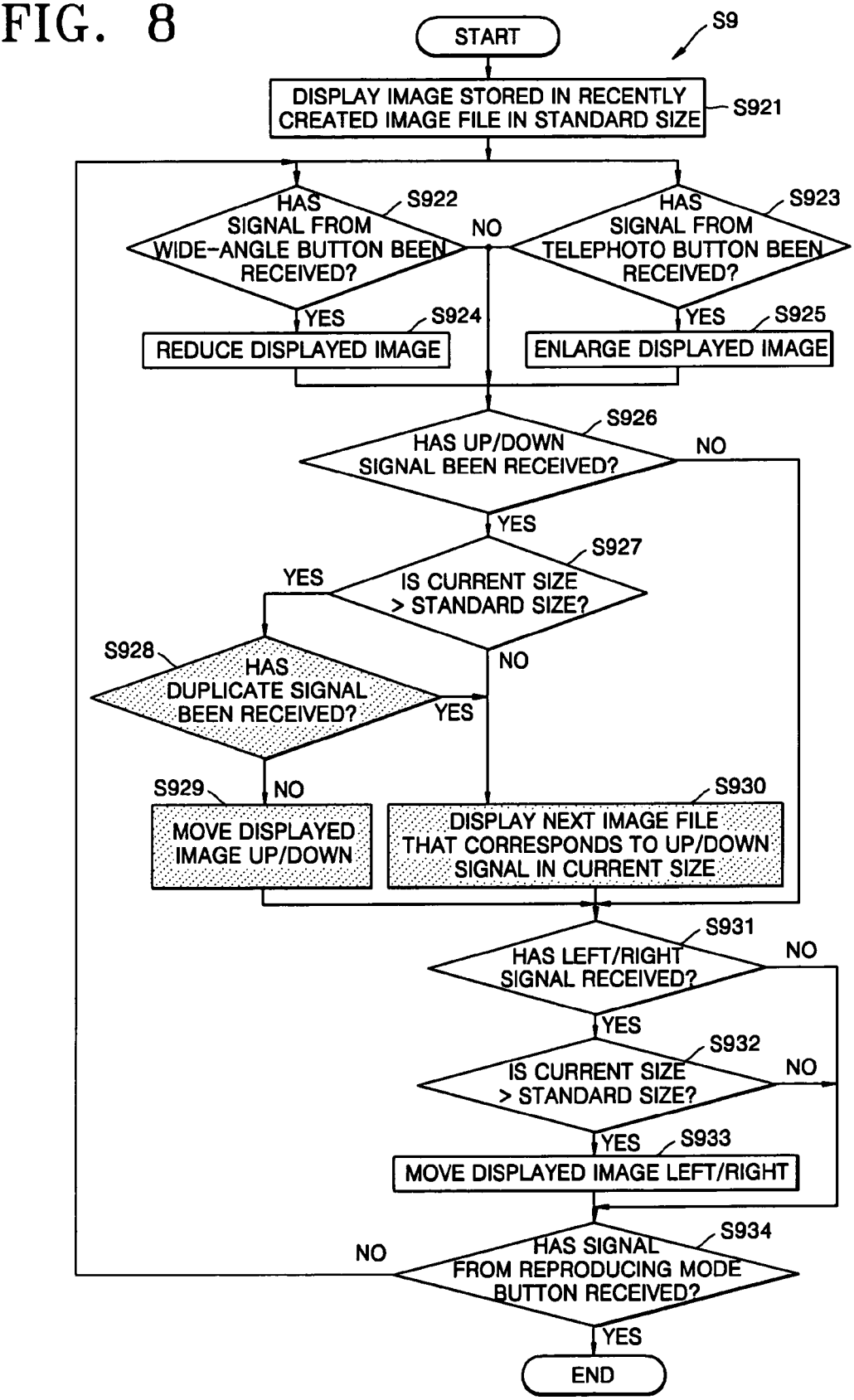
FIG. 8 is a flow chart illustrating another embodiment of a procedure for performing step S9 of FIG. 4.

FIG. 8 illustrates the reproducing mode (Operation S9) of the method of FIG. 4 according to anther embodiment of the present invention. First, the differences between the reproducing modes illustrated in FIGS. 7 and 8 will be described.

In the reproducing mode illustrated in FIG. 7, the next image file in the forward direction is displayed by pressing the self-timer/right button 15$_R$, but a macro/down button 15$_D$ is pressed to display the next image file in the forward direction in the reproducing mode illustrated in FIG. 8.

Also, the next image file in the reverse direction is displayed by pressing the flash/left button 15$_L$ in the reproducing mode illustrated in FIG. 7, whereas an audio/up button 15$_U$ is pressed to display the next image file in the reverse direction in the reproducing mode illustrated in FIG. 8.

Also, while an operating signal in the reproducing mode illustrated in FIG. 7 is the signal from the monitor button signal generated together with the left or right signal, the operating signal in the reproducing mode illustrated in FIG. 8 is a duplicate up or down signal.

Lastly, when displaying an image contained in the next image file in the forward or reverse direction by generating the operating signal while the currently enlarged image is displayed, the image of the next image file is displayed at the standard size in the reproducing mode illustrated in FIG. 7. However, the image contained in the next image file is displayed at the currently enlarged size in the reproducing mode illustrated in FIG. 8

Referring to FIGS. 1 through 3 and FIG. 8, in another method of performing the reproducing mode (Operation S9) illustrated in FIG. 4, first, the DSP 507 controls the LCD driving unit 514 so that an image of an image file recently created in the recording medium can be displayed at a standard size (Operation S921).

When a signal from the wide-angle zoom button 39$_W$ is generated by a user pressing the wide-angle zoom button 39$_W$ (Operation S922), the DSP 507 controls the LCD driving unit 514 so that the currently displayed image is displayed after being reduced by a unit scale factor (Operation S924). Conversely, when the user presses a telephoto zoom button 39$_T$ and a signal is generated by the telephoto zoom button 39$_T$ (Operation S923), the DSP 507 controls the LCD driving unit 514 so that the currently displayed image is displayed after being enlarged by a unit scale factor (Operation S925).

Next, when the user presses the audio-memo/up button 15$_U$ or the macro/down button 15$_D$, an up or down signal is generated (Operation S926), and the DSP 507 checks whether the currently displayed image is enlarged (Operation S927).

If the currently displayed image is determined not to be enlarged in operation S927, the DSP 507 controls the LCD driving unit 514 so that an image contained in the image file that corresponds to the up or down signal is displayed at the current size (Operation S930). That is, if the user presses the macro/down button 15$_D$ when the currently displayed image is not enlarged, the next image file in the forward direction is displayed at the current size, and if the user presses the audio-memo/up button 15$_U$, the next image file in the reverse direction is displayed at the current size.

If the currently displayed image is determined to be enlarged in operation S927, the DSP 507 checks whether a duplicate signal has been generated by the user pressing the audio-memo/up button 15$_U$ twice or by pressing the macro/down button 15$_D$ twice in operation S926 (Operation S928).

If the duplicate signal is not generated in operation S928, the DSP 507 controls the LCD driving unit 514 so that the display region of the enlarged image is moved up or down in response to the up or down signal (Operation S929).

If it is determined that the duplicate signal has been generated in operation S928, the DSP 507 controls the LCD driving unit 514 so that the image of the next image file that corresponds to the up or down signal in operation S926 is displayed at the standard size (Operation S930). That is, if the user presses the macro/down button 15$_D$ twice when the currently displayed image is enlarged, the next image file in the forward direction is displayed, and if the user presses the audio-memo/up button 15$_U$ twice, the next image file in the reverse direction is displayed.

As such, the next image file in the forward or reverse direction can be displayed when the currently displayed image is enlarged by using a first or second operation signal that includes the signal from the macro/down button 15$_D$ or the audio-memo/up button 15$_U$. That is, using the audio-memo/up button 15$_U$ or the macro/down button 15$_D$ that performs a first function in the first condition and performs the second function in the second condition, which exists only in correspondence to the first condition, the first function can be directly performed in the second condition. As a result, the process of recovering to the first condition of standard image display from the second condition of enlarged image display in order to perform the first function is no longer necessary, thereby increasing convenience to the users.

When a left or right signal is generated by the user by pressing the flash/left down 15$_L$ or the self-timer/right button 15$_R$ (Operation S931), the DSP 507 checks whether the currently displayed image is enlarged (Operation S932). If it is determined that the currently displayed image is enlarged in operation S932, the DSP 507 controls the LCD driving unit 514 so that the displayed region of the enlarged image moves left or right in response to the left or right signal (Operation S933).

The operations S922 through S933 are repeated until a signal is generated by a reproducing mode button 42 (Operation S934).

As described above, according to a method of controlling a digital photographing apparatus and a digital photographing apparatus adopting the same according to the present invention, when a first or second operating signal that includes a signal from a first or second direction button is used, the next file in the forward or reverse direction may be directly displayed according to the first or second operating signal even when the currently displayed image is enlarged.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for controlling a digital photographing apparatus comprising:
   displaying an image on a display screen in a reproduction mode;
   detecting that a user has pressed a button with at least two functions in the reproduction mode, wherein a first function of the button is to move a display region of a displayed image and a second function of the button is to display a next image file in a forward direction or a next image file in a reverse direction on the display screen;

determining whether the image on the display screen is enlarged;
if the image on the display screen is enlarged, performing the first function of the button if a first operating signal is generated;
if the image on the display screen is not enlarged, performing the second function of the button if the first operating signal is generated; and
if the image on the display screen is enlarged, performing the second function of the button if a second operating signal containing the first operating signal is generated.

2. The method of claim 1, wherein the button is a left direction button or a right direction button.

3. The method of claim 1, wherein a digital signal processor controls the apparatus to perform the first function under a first condition, the first function under a second condition, and the second function under the second condition based upon an input from a user.

4. The method of claim 1, wherein
the first operating signal is generated when the button is pressed; and
the second operating signal is generated when a second button is pressed while the first button is being pressed.

5. The method of claim 1, wherein
the first operating signal is generated when the button is pressed once; and
the second operating signal is generated when the button is pressed at least twice.

6. A digital photographing apparatus, the apparatus comprising:
an optical system that receives light from a subject to be photographed by the apparatus;
a digital signal processor that receives signals representing the light received by the optical system and converts the signals into an image;
a storage medium for storing at least one image file;
a display screen for displaying the image files;
a user input unit including at least one button capable of performing at least two functions while operating under a single condition in a reproduction mode, wherein a first function of the at least one button is to move a display region of a displayed image and a second function of the at least one button is to display a next image file in a forward direction or a next image file in a reverse direction on the display screen;
means for performing the first function of the at least one button if a first operating signal is generated; and
means for performing the second function of the at least one button if a second operating signal containing the first operating signal is generated.

7. The apparatus of claim 6, wherein
the at least one button is one of a plurality of buttons;
the first operating signal is generated when the at least one button is pressed; and
the second operating signal is generated when a second button is pressed while the at least one button is being pressed.

8. The apparatus of claim 6, wherein
the first operating signal is generated when the at least one button is pressed once; and
the second operating signal is generated when the at least one button is pressed at least twice.

9. The apparatus of claim 6, wherein the at least one button capable of performing at least two functions is one of a plurality of buttons capable of performing at least two functions.

10. The apparatus of claim 6, wherein the at least one button capable of performing at least two functions is a left direction button, a right direction button, an up direction button, or a down direction button.

11. The apparatus of claim 6, wherein the digital signal processor controls the apparatus to perform a first function if a first operating signal is active and a second function if a second operating signal is active.

12. The apparatus of claim 6, wherein the single condition comprises the camera currently displaying an enlarged image.

13. A digital camera comprising:
means for obtaining an image of a subject to be photographed;
means for storing at least two image files;
means for displaying an image file;
means for commanding the digital camera to display the image file in an enlarged mode and a non-enlarged mode in a reproduction mode;
means for generating a first operating signal to direct the digital camera to perform a first function under a first condition in the reproduction mode, wherein the first function is to move a display region of a displayed image;
means for generating a second operating signal to direct the digital camera to perform a second function under a second condition in the reproduction mode; and
means for generating a third operating signal to direct the digital camera to perform the second function under the first condition in the reproduction mode, wherein the second function is to display a next image file in a forward direction or a next image file in a reverse direction.

14. The digital camera of claim 13, wherein the means for generating the first operating signal is a first button, the means for generating the third operating signal is a second button, and the means for generating the second operating signal is the first button and the second button wherein the first button and the second button are pressed substantially simultaneously.

15. The digital camera of claim 13, wherein the means for generating a first operating signal is a first button and the means for generating a second operation.

16. The digital camera of claim 13, wherein
the first operating signal is generated when the first button is pressed once; and
the second operating signal is generated when the first button is pressed at least twice.

17. The digital camera of claim 13, wherein the second function comprises displaying a next image file in a forward direction or a next image file in a reverse direction, and the first function comprises shifting a display region of a displayed image.

18. The digital camera of claim 13, wherein the obtaining means comprises an optical system and a photoelectric converter, wherein the optical system receives light from the subject and the photoelectric converter converts the light into analog electrical signals.

19. The digital camera of claim 13, wherein the first condition exists where the image file is displayed in the enlarged mode and the second condition exists where the image file is displayed in the non-enlarged mode.

* * * * *